United States Patent Office 3,378,567
Patented Apr. 16, 1968

3,378,567
5-DILOWERALKYLAMINOALKOXY ETHERS OF 4-AZA - 10,11 - DIHYDRO - 5H - DIBENZO[a,d] - CYCLOHEPTENE DERIVATIVES
Frank J. Villani, West Caldwell, N.J., assignor to Schering Corporation, Bloomfield, N.J., a corporation of New Jersey
No Drawing. Filed Dec. 20, 1965, Ser. No. 515,157
9 Claims. (Cl. 260—296)

This invention relates to novel compositions of matter classifiable in the field of organic chemistry as 5 - (dilower-alkylamino lower-alkoxy) - 4 - aza - 10,11-dihydro-5H - dibenzo - [a,d] - cycloheptenes, to methods of preparing such compositions, and to methods of employing such compositions as antihistaminic agents. More particularly, this invention relates to such dibenzocycloheptenes having at the 5-position a further substituent selected from the group consisting of hydrogen and lower alkyl.

In one of its composition aspects, the instant invention may be described as residing in the concept of a new class of chemical compounds characterized by a molecular structure in which there is attached to the 5-position of a 5 - (dilower - alkyl- aminolower - alkoxy) - 4 - aza-10,11-dihydro - 5H - dibenzo - [a,d] - cycloheptene a further substituent selected from the group consisting of hydrogen and lower alkyl.

In another of its composition aspects the instant invention may be described as residing in the concept of therapeutic formulations for the application of antihistaminic therapy containing as the essential active ingredient a chemical compound characterized by a molecular structure in which there is attached to the 5-position of a 5-(dilower - alkylamino lower - alkoxy) - 4 - aza - 10,11-dihydro - 5H - dibenzo - [a,d] - cycloheptene a further substituent selected from the group consisting of hydrogen and lower alkyl.

In one of its process aspects the instant invention may be described as residing in the concept of preparing 5-(dilower - alkylamino lower - alkoxy - 4 - aza - 10,11, dihydro - 5H - dibenzo - [a,d] - cycloheptenes by the condensation of 5 - hydroxy - 4 - aza-10,11-dihydro-5H-dibenzo - [a,d] - cycloheptene with a dilower-alkylamino lower-alkyl halide in the presence of a basic condensing agent to form the corresponding 5-dilower-alkylamino lower-alkoxy-ether.

In another of its process aspects the instant invention may be described as residing in the concept of preparing 5 - lower alkyl - 5 -(dilower - alkylamino lower-alkoxy)-4 - aza - 10,11 - dihydro - 5H - dibenzo-[a,d]-cyclo-heptenes by the condensation of a 5 - lower-alkyl-5-hy-droxy - 4 - aza - 10,11 - dihydro - 5H - dibenzo - [a,d]-cycloheptene with a dilower-alkylamino lower-alkyl halide in the presence of a basic condensing agent to form the corresponding 5-dilower-alkylamino lower-alkoxy ether.

In yet another of its process aspects, the instant invention may be described as residing in the concept of a method for achieving an antihistaminic response which comprises administering dosage units of therapeutic formulations containing as the essential active ingredients a chemical compound characterized by a molecular structure in which thre is attached to the 5 position of a 5-(dilower-alkylamino lower - alkoxy) - 4 - aza - 10,11 - dihydro-5H - dibenzo - [a,d]-cycloheptene a substituent selected from the group consisting of hydrogen and lower alkyl.

The instant invention is based upon the discovery that the tangible embodiments of the composition aspect described above possess antihistaminic activity as determined by standard pharmacological evaluation (i.e., the Guinea Pig Histamine Aerosol Test).

As used herein the term "dilower alkyl amino" is intended to include dilower alkylamino groups wherein the amino nitrogen is di-substituted by lower alkyl groups, including straight or branched chain lower alkyl groups, having from 1–4 carbon atoms. Typical dilower alkyl amino groups which may be present include, for example, but without limiting the generality of the foregoing, dimethylamino, diethylamino, dipropylamino, diisopropyl-amino, dibutylamino and the like.

The term "lower alkoxy" as used herein is intended to include lower alkoxy groups, both straight and branched chain, having a chain of up to four carbon atoms attached to the 5-position. Included within this group, for example, are such lower alkoxy groups as ethoxy, propoxy, butoxy, isopropoxy, isobutoxy and the like. Taken together, therefore, the term "dilower-alkylamino lower-alkoxy" as used herein is intended to include, for example, such dilower-amino lower-alkoxy groups as dimethylaminoethoxy, di-propylaminoethoxy, diisopropylaminopropoxy, dimethyl-aminobutoxy, diethylaminoisopropoxy, dipropylamino-ethoxy, dimethylaminopropoxy, diethylaminopropoxy, di-isopropylaminoethoxy and the like.

As used herein the term "lower alkyl" is intended to include lower alkyl groups, both straight and branched chain, having one to six carbon atoms attached to the 5-positon of the azadibenzocycloheptene moiety. Included within this group, for example, are such lower alkyl groups as methyl, ethyl, propyl, butyl, pentyl, isopropyl, isobutyl and the like.

The basic condensing agents employed in the process aspects of this invention in general are those well-known to chemists skilled in the art and include, for example, metal alkoxides and metal hydrides such as sodium methoxide, sodium hydride, potassium tertiary butoxide and potassium hydride. These materials are readily available commercially either as the bulk compound or as suspensions in an inert media such as mineral oil. The basic condensing agent preferably employed in the process aspect of this invention is a 50% by weight dispersion of sodium hydride in mineral oil.

The manner and process of making and using the invention will now be generally described so as to enable a person skilled in the art of chemistry to make and use the same as follows:

As noted above, the starting materials used in the preparation of the novel compounds of this invention are 5-hydroxy-4-aza-10,11-dihydro-5H-dibenzo-[a,d] - cycloheptene or the corresponding 5-hydroxy-5-lower alkyl analog thereof. These starting materials are readily prepared from 4-aza-10,11-dihydro-5H-dibenzo-[a,d]-cyclo-heptene-5-one, a compound well known in the art whose preparation is fully described in Belgian Patent No. 647,-043, issued Oct. 22, 1964.

To prepare secondary carbinol starting material (i.e. 5 - hydroxy-4-aza-10,11-dihydro-5H-dibenzo-[a,d]-cyclo-heptene), the 5-keto compound of the Belgian Patent is treated with a reducing agent such as, for example, the alkali metal borohydrides including sodium, potassium and lithium borohydrides, in the presence of a non-reactive organic solvent such as dioxane, tetrahydrofuran, methanol, ethanol and the like. Preferably the reduction is carried out in methanolic solution using sodium borohydride as the reducing agent. The reduction may be conducted at a temperature ranging from about 0 to about 5° C. and usually requires from about 1 to about 3 hours for completion.

To prepare the tertiary carbinol starting materials (i.e. 5-lower - alkyl-5 - hydroxy-4-aza - 10,11-dihydro - 5H-di-benzo-[a,d]-cycloheptene), the 5-keto compound is subjected to the conventional Grignard reaction employing the desired lower alkyl magnesium halide. Thus, for example, 5-methyl-5-hydroxy-4-aza-10,11-dihydro-5H - dibenzo-[a,d]-cycloheptene may be prepared by treating an ether solution of the said ketone with Grignard reagent (methyl magnesium iodide previously prepared in situ) in the usual manner. Preparation of starting materials having a 5-lower alkyl substituent other than methyl, merely requires the selection of the appropriate alkyl halide.

Conversion of either the secondary or tertiary carbinol starting materials described above into the 5-(diloweralkylamino lower-alkoxy)-4 - aza - 10,11 - dihydro-5H-dibenzo-[a,d]-cycloheptene embodiments of the instant invention is readily accomplished by the reaction of either the secondary or tertiary carbinols with essentially equimolar quantities of di-lower alkylamino lower alkyl halide in an anhydrous inert organic solvent as defined below, and in the presence of a basic condensing agent of the type previously described. The etherification reaction is in general conducted at somewhat elevated temperatures (i.e., from about 70 to about 120° C.) and at concentrations dependent on the particular solvent and the characteristics of the starting material. The reaction usually requires from about 0.5 to about 3.0 hours. The reaction mixture is usually processed by pouring it into several volumes of water and extracting the product with a suitable water-immiscible organic solvent. The solvent extract is dried, usually over anhydrous magnesium sulfate and concentrated to a residue usually in vacuo to yield the desired product which may be purified from a suitable solvent in the usual manner. The processing of reactions in which the metal hydrides are used as basic condensing agents should be done with caution as any of this reagent remaining at the completion of the reaction may react vigorously with water.

The etherification is carried out in an organic solvent in which the reactants have reasonable solubility and which does not adversely affect the course or rate of the desired reaction. Exemplary of such solvents are aromatic hydrocarbons such as toluene and benzene, alkyl ethers such as dibutyl ether, cyclic ethers, for example, tetrahydrofuran and dioxane, di-alkyl amides such as dimethylformamide and dimethylacetamide and the like. I prefer to use dioxane because of its high solvency for diverse types of organic compounds.

The products of the above general reactions may be purified by crystallization from a suitable solvent or solvent system. The choice of solvent or solvent system being dependent in part on the solubility of the product which is due in part to the substituents on the aza-dibenzo-cycloheptene nucleus.

Having described the general methods for preparing the tangible embodiments of my invention, a few specific preparations are herein included for the sake of clarity.

PREPARATION 1

5-hydroxy-4-aza-10,11-dihydro-5H-dibenzo[a,d]-cycloheptene

Dissolve 9.6 g. of 4-aza-10,11 - dihydro-5H-dibenzo-[a,d]-cycloheptene-5-one in 300 ml. of anhydrous methanol. Cool the resulting solution to 0°–5° C. with stirring. Add in small portions a total of 19 g. of sodium borohydride. Stir for an additional 20–30 minutes and pour into 800 ml. of ice water.

Extract the product into chloroform. Wash the extracts with water and concentrate to a residue on a steam bath. Recrystallize the produce from isopropyl ether.

PREPARATION 2

5-methyl-5-hydroxy-4-aza-10,11-dihydro-5H-dibenzo-[a,d]-cycloheptene

Prepare methyl magnesium iodide from methyl iodide (46.8 g.) and magnesium metal (9.6 g.) in 500 ml. of anhydrous ether. Add 4-aza-10,11-dihydro-5H-dibenzo-[a,d]-cycloheptene-5-one in 100 ml. of anhydrous ether with stirring. Reflux the reaction mixture for 2 hours, cool to room temperature and add 200 ml. of 10% $NH_4Cl$ solution. Separate the solvent layers and dry the ether layer over anhydrous magnesium sulfate. Filter off the solid phase and concentrate the ethereal solution to a residue to recover the product.

The best mode contemplated by me for carrying out my invention will now be set forth as follows:

EXAMPLE 1

5-(2-dimethylaminoethoxy)-4-aza-10,11-dihydro-5H-dibenzo-[a,d]-cycloheptene

Add dropwise a solution of 9.6 g. of 5-hydroxy-4-aza-10,11-dihydro-5H-dibenzo-[a,d]-cycloheptene in 60 ml. of dry dioxane to a refluxing suspension of 4.4 gms. of 50% sodium hydride dispersion in 100 ml. of dry dioxane. Stir for an additional 30 minutes at reflux. Cool slightly and add 7.4 g. of 2-dimethylaminoethyl chloride. Stir an additional 45 minutes and remove the solvent by distillation. Dissolve the residue in water and extract with ethyl ether. Dry the ethereal solution over anhydrous magnesium sulfate and concentrate to a residue consisting of 5-[2-dimethylaminoethoxy] - 4 - aza-10,11-dihydro-5H-dibenzo-[a,d]-cycloheptene.

EXAMPLE 2

5-methyl-5-(3-dimethylaminopropoxy)-4-aza-10,11-dihydro-5H-dibenzo-[a,d]-cycloheptene Add a solution of 13.5 g. of the 5-hydroxy-5-methyl-4 - aza-10,11-dihydro-5H-dibenzo-[a,d]-cycloheptene in 100 ml. of dry dioxane to a refluxing suspension of 4.80 g. of 50% sodium hydride in 150 ml. of dry dioxane. Stir for an additional 30 minutes at reflux. Cool slightly and add 7.4 gms. of 3-dimethylaminopropyl chloride in 150 ml. of dry dioxane and utilize the procedure of Example 1 to obtain the product of this example.

EXAMPLE 3

5-(3-dimethylaminopropoxy)-4-aza-10,11-dihydro-5H-dibenzo-[a,d]-cycloheptene

Add dropwise a solution of 9.6 g. of 5-hydroxy-4-aza-10,11-dihydro-5H-dibenzo-[a,d]-cycloheptene in 60 ml. of dry dioxane to a refluxing suspension of 4.4 g. of 50% sodium hydride in 100 ml. of dioxane. Stir for an additional 30 minutes at reflux. Cool slightly and add 9.0 g. 3-dimethylaminopropyl chloride. Stir for an additional 45 minutes and remove the solvent by distillation in vacuo. Suspend the residue in water and extract the product with ethyl ether. Dry the ethereal solution and distill to recover the 5-(3-dimethylaminopropoxy)-4-aza-10,11-dihydro-5H-dibenzo-[a,d]-cycloheptene.

EXAMPLE 4

5-(2-dibutylaminoethoxy)-4-aza-10,11-dihydro-5H-dibenzo-[a,d]-cycloheptene

To a refluxing suspension of 4.4 g. of 50% sodium hydride in 100 ml. of dioxane add dropwise a solution of 9.6 g. 5 - hydroxy-4-aza-10,11-dihydro-5H-dibenzo-[a,d]-cycloheptene in 60 ml. of dry dioxane. Stir for 30 minutes at reflux. Cool slightly and add 9.65 g. dibutylaminoethyl chloride. Stir for an additional 45 minutes and remove the solvent by distillation in vacuo. Suspend the residue in water and extract with ethyl ether. Dry the ethereal solution and distill to recover the 5-(2-dibutylaminoethoxy) - 4 - aza - 10,11-dihydro-5H-dibenzo-[a,d]-cycloheptene.

EXAMPLE 5

5-butyl-5-(2-dimethylaminoethoxy)-4-aza-10,11-dihydro-5H-dibenzo-[a,d]-cycloheptene To a refluxing suspension of 4.40 g. of 50% in sodium hydride in 100 ml. of dioxane, add dropwise a solution of 9.8 g. 5-hydroxy-5-butyl-4-aza-10,11-dihydro-5H-dibenzo-[a,d]-cycloheptene. Stir for 30 minutes at reflux. Cool slightly and add 7.4 g. of 2-dimethylaminoethyl chloride and stir for an additional 45 minutes. Remove the solvent by distillation in vacuo. Dissolve the residue in water and extract with ethyl ether. Dry the ethereal extract and distill to recover the 5-butyl-5-(2-dimethylaminoethoxy) - 4-aza-10,11-dihydro-5H-dibenzo-[a,d]-cycloheptene.

The tangible embodiments of the invention can be administered orally in the form of tablets, capsules, elixirs, and the like. In tablet form, they are compounded with an inert pharmaceutical carrier which may contain a suitable binder such as, for example, gums, starches and sugars. They may also be incorporated into a gelatin capsule and also formulated into elixirs which have the advantage of being susceptible to manipulations in flavor by the addition of standard natural or synthetic flavoring materials. Further the tangible embodiments of this invention may be advantageously employed in injectible formulations suitable for parenteral administration. Preferably these compositions are so proportioned as to afford a unit dosage of from 4 to 50 milligrams.

In any of the formulations noted above the tangible embodiments of this invention may be employed either as the free base or in the form of non-toxic pharmaceutically acceptable acid addition salts of organic and inorganic acids. Exemplary of such salts are those derived from maleic, citric, tartaric, hydrochloric, hydrobromic, sulfuric and phosphoric. These salts are readily prepared by neutralization of the free base with the desired acid in an inert solvent such as ether.

The following examples show typical tablet, capsule, elixir and injectible formulations incorporating the tangible embodiments of this invention. The formulations are illustrative merely and no limitation is intended except as set forth in the appended claims.

ELIXIR FORMULATION

Formula: Grams per liter
5-(2-dimethylaminoethoxy)-4-aza-10,11-dihydro-
  5H-dibenzo-[a,d]-cycloheptene dihydro-
  chloride _____ 10.0
Sodium citrate, USP _____ 10.0
Sodium benzoate, USP _____ 1.0
Sorbitol solution, USP _____ 200.0
Propylene glycol, USP _____ 50.0
Sucrose, food grade _____ 600.0
Peppermint oil, 0.1 ml.
Purified water, USP, q.s. to 1.0 liter.

Dissolve successively the sodium citrate, sodium benzoate, 5-(2-dimethylaminoethoxy)-4-aza-10,11 - dihydro-5H-dibenzo-[a,d]-cycloheptene dihydrochloride in approximately 300–400 ml. of purified water with gentle warming and agitation. Add to the clear solution the sorbitol solution propylene glycol and sucrose and agitate until homogeneous. Cool the batch to room temperature and add the peppermint oil flavor. Add 5 gms. of a suitable filter aid (Hi flow super cel-Johns Mansville) and filter the solution. Bring the solution up to final volume (1.0 liter) with additional purified water. Bottle the syrup in suitably sized containers. Each teaspoon (5 ml.) of this formulation delivers 50 mg. of the active cycloheptene.

INJECTABLE FORMULATION

Formula: Grams per 100 milliliter
5-butyl-5-(2-dimethylaminoethoxy)-4-aza-
  10,11-dihydro-5H-dibenzo-[a,d]-cyclo-
  heptene dimaleate _____ 2.0
Benzyl alcohol, UF _____ 0.50
Methyl paraben, USP _____ 0.18
Propyl paraben, USP _____ 0.02
Water, q.s. to 100 ml.

At 60°–70° dissolve the parabens in approximately 85 ml. of water. Cool the solution to 40° C. and add the benzyl alcohol. Cool the resultant solution to room temperature and dissolve the antihistamine. Filter the batch through a suitable sterilizing filter into a clean receptacle. Fill suitably sized vials with the clear solution, cap loosely and autoclave for one-half hour at 121° C. (15 p.s.i.g.). Each milliliter of this formation delivers 20 mg. of the active cycloheptene.

TABLET FORMULATION

Formula: Grams per 100 tablets
5-(3-diethylaminopropoxy)-4-aza-10,11-dihydro-
  5H-dibenzo-[a,d]-cycloheptene _____ 2.0
Starch, food grade _____ 1.0
Lactose, USP _____ 16.9
Magnesium stearate, USP _____ 0.1
                                          ____
                                          20.0

This formulation will make 100 tablets of 20 mgs. each. Blend antihistamine with the starch in a suitable container. Add the lactose portionwise. Add the magnesium stearate and blend thoroughly. Punch the mix into tablets (200 mg. target weight).

CAPSULE FORMULATION

Formula: Grams per 100 capsules
5-(2-dimethylaminoethoxy)-4-aza-10,11-dihydro-
  5H-dibenzo-[a,d]-cycloheptene _____ 2.0
Lactose, USP _____ 179.5
Magnesium stearate _____ 0.5
                                          _____
                                          200.0
Hard shell two piece capsule No. 2 _____ 100

Charge the antihistamine and an equal amount of lactose into a suitable blending vessel and mix until uniform. Add this premix to the remainder of the lactose and mix until homogeneous. Take a portion of this blend and mix with the magnesium stearate until uniform then add this to the bulk of the product mix and re-blend until the product is homogeneous. Fill into capsules. Each capsule will deliver 20 mg. of the active cycloheptene.

Effective antihistaminic response is usually achieved by the daily administration of about 20 to about 200 mg. of the tangible embodiments of this invention. In severe or aggravated conditions additional medication may be required.

Although the composition and process aspects of this invention have been described above in terms of novel antihistaminic compositions of matter characterized by a molecular structure in which there is attached to the 5-position of a 5-(dilower alkylamino lower alkoxy)-4-aza-10,11-dihydro-5H-dibenzo-[a,d]-cycloheptene a substituent selected from the group consisting of hydrogen and lower alkyl, many modifications in these compositions of matter will suggest themselves to one skilled in the art from a study of the foregoing description. It will be obvious, for example, that the nitrogen atom of the fused pyridine ring may occupy positions other than the 4-position (i.e., Positions 1, 2 or 3, giving rise to the 1-aza, 2-aza or 3-aza analogs of the 4-aza compounds described above). Also, it will be obvious that the benzenoid portion of the aza dibenzocycloheptene nucleus may bear substituents at Positions 7, 8 or 9. Included among such substituents, for example, would be lower alkyl groups, preferably methyl and ethyl; halogen, preferably chlorine and bromine; trifluoromethyl; alkoxy, preferably methoxy and ethoxy; hydroxy and lower alkoxy. It will be obvious as well that unsaturation may be introduced between Positions 10 and 11 giving rise to the corresponding 10,11-dehydro analogs. Preparation of the starting materials for all such compounds can be carried out as described above employing the appropriate 5-ketone disclosed in Belgian Patent 647,043.

Further, it will be obvious to one skilled in the art that the alkyl chain of the terminal dilower alkylamino grouping may be joined to form a nitrogen containing heterocyclic structure such as, for example, pyrrolidino, piperidino, pyrazolino, imidazolino, morpholino and the like. Such derivatives would be prepared by employing the appropriate heterocyclic amino lower alkyl halide in the etherification reaction described above.

Applicant considers all of these modifications to be the full equivalents of the tangible embodiments of this invention specifically illustrated. All such modifications, therefore, are considered to be a part of, and to fall within the scope of this invention.

The subject matter which applicant regards as his invention is specifically pointed out and distinctly claimed as follows:

1. 5-(dilower-alkylamino lower-alkoxy)-4-aza-10,11-dihydro-5H-dibenzo-[a,d]-cycloheptene characterized by having at the 5-position a further substituent selected from the group consisting of hydrogen and lower alkyl.

2. A compound of claim 1 wherein the further substituent at the 5-position is hydrogen.

3. A compound of claim 1 wherein the further substituent at the 5-position is lower alkyl.

4. The compound of claim 2 wherein the dilower-alkylamino lower-alkoxy group is 2-dimethylaminoethoxy.

5. The compound of claim 2 wherein the dilower-alkylamino lower-alkoxy group is 3-dimethylaminopropoxy.

6. The compound of claim 2 wherein the dilower-alkylamino lower-alkoxy group is 2-dibutylaminoethoxy.

7. The compound of claim 3 wherein the dilower-alkylamino lower-alkoxy group is 3-dimethylaminopropoxy and the lower alkyl substituent in the 5-position is methyl.

8. The compound of claim 3 wherein the dilower-alkylamino lower-alkoxy group is 2-dimethylaminoethoxy and the lower alkyl substituent in the 5-position is butyl.

9. A compound of claim 1 in the form of a non-toxic pharmaceutically acceptable acid addition salt thereof.

References Cited

UNITED STATES PATENTS 3,326,924   6/1967   Villani _____ 260—293

FOREIGN PATENTS 647,043   10/1964   Belgium.

JOHN D. RANDOLPH, *Primary Examiner.*

A. L. ROTMAN, *Assistant Examiner.*